United States Patent [19]

Yagisawa

[11] Patent Number: 4,811,976
[45] Date of Patent: Mar. 14, 1989

[54] NUT HOLDING THRUST BEARING AND HIGHLY HERMETICAL SEALING FLUID JOINT WITH THE SAME NUT

[75] Inventor: Shigeru Yagisawa, Kawasaki, Japan

[73] Assignee: Toyoko Kagaku Co., Ltd., Kanagawa, Japan

[21] Appl. No.: 65,551

[22] Filed: Jun. 23, 1987

[30] Foreign Application Priority Data

Jul. 4, 1986 [JP] Japan .................. 61-102007[U]

[51] Int. Cl.⁴ ............................................. F16L 25/00
[52] U.S. Cl. ................................ 285/328; 285/354; 285/917; 411/332
[58] Field of Search .............. 285/353, 354, 384, 281, 285/386, 385, 328, 276, 917; 384/609; 411/433, 432, 1, 917, 534, 427, 428

[56] References Cited

U.S. PATENT DOCUMENTS

| | | | |
|---|---|---|---|
| 823,944 | 6/1906 | Hart | 285/353 |
| 833,784 | 10/1906 | Hicks | 285/354 |
| 1,995,109 | 3/1935 | Smittle | 285/354 |
| 3,372,948 | 3/1968 | Arneson | 285/174 |
| 3,383,973 | 5/1968 | Gazal | 411/1 |
| 3,521,910 | 7/1970 | Callahan, Jr. et al. | 285/353 |
| 4,366,973 | 1/1983 | Brekke | 285/281 |
| 4,427,222 | 1/1984 | Abbes et al. | 285/353 |
| 4,660,868 | 4/1987 | Totani | 285/354 |
| 4,685,707 | 8/1987 | Miyashita | 285/354 |

FOREIGN PATENT DOCUMENTS

| | | | |
|---|---|---|---|
| 518930 | 3/1940 | United Kingdom | 285/281 |
| 883498 | 11/1961 | United Kingdom | 285/281 |

Primary Examiner—Randolph A. Reese
Assistant Examiner—Anthony Knight
Attorney, Agent, or Firm—Donald W. Hanson

[57] ABSTRACT

A nut adapter to be formed to hardly twist a pipe welded to a cap nut clamping fluid joint or eliminate the twist of the pipe when clamping the cap nut of the fluid joint, and a fluid joint having the nut. This nut holds a thrust bearing at a position of the nut, corresponding to the surface of the nut for pressing a sleeve when clamping the nut so that, when an unreasonable force is applied, the nut and the sleeve rotate together so as not to transmit a rotary torque to the pipe.

8 Claims, 3 Drawing Sheets

NUT HOLDING THRUST BEARING AND HIGHLY HERMETICAL SEALING FLUID JOINT WITH THE SAME NUT

BACKGROUND OF THE INVENTION

This invention relates to a nut adapted to eliminate the transmission of a rotary torque produced by clamping a nut to a conduit and a highly hermetically sealing fluid joint for a semiconductor fabricating apparatus provided with the same nut.

The necessity of fabricating a remarkably large scale integrated circuit has recently occurred as in a super LSI or superhigh LSI in the high acceleration of technical advancement. Since there is a requirement of using extremely toxic gaseous fluids such as a silane, an arsine or a phosphine and forming a film of high purity in a superhigh vacuum so as to fabricate such a large scale integrated circuit, this semiconductor fabricating apparatus is necessitated to maintain highly hermetical sealability.

However, in order to couple the fluid passage forming elements of such a semiconductor fabricating apparatus, it is impossible to couple by welding all the elements, and the fabricating apparatus cannot be completed unless all fluid joints have excellent hermetical sealability. There exist various types of joints used for this purpose, and there is representatively a fluid joint which, as shown in FIG. 8, couples two sleeves 1 and 2 through a gasket 3 by engaging a nut 5 clamped on the other sleeve 2 with a gland 4 formed with threads on the outer periphery on which the sleeve 1 is mounted. Since such a cap nut clamping has advantages of simplicity and no large space, the cap nuts are frequently employed in case of conduits of small diameter, but the cap nut still has drawbacks that a rotary torque is applied to the sleeve 2 due to a friction between the cap nut (female nut) 5 and the sleeve 2 and a conduit welded to the sleeve 2 is twisted due to the rotary torque and the surface of the gasket is scratched by the rotation of the sleeve 2 with the result that the fluid can leak therefrom. In order to prevent the fluid in the conduit from leaking, there is generally employed a method of clamping the cap nut while suppressing the rotation of the sleeve 2 by contacting a spanner with the chamfered position 6 of the sleeve 2 by chamfering the sleeve 2. However, since this method must suppress the rotation of the gland 4 and the sleeve 2 at the two positions and must also clamp the cap nut 5, it is impossible to operate these steps by one worker, and since the steps have to be worked very carefully, there is a drawback that the working efficiency is remarkably reduced. The inventor of this invention has invented an improved nut in which, as shown in FIG. 9, a number of small spheres 8 are held in a ring-shaped groove 9 on the surface of a cap nut 7 to be contacted under pressure with a sleeve 2 so as to eliminate the above-mentioned drawbacks.

However, since this improved nut can eliminate the above-mentioned drawbacks of the conventional nut, but the small sphere holder of the nut is required to be precisely machined to cause the nuts to have the right productivity, and there is possibility of damaging the small sphere holder if the nut is clamped by a higher torque than the specified value due to the mistake of a worker, and since the small spheres 8 are contacted at points with the sleeve 2, there arises another difficulty that the strength of the small spheres is weakened.

BRIEF SUMMARY OF THE INVENTION

An object of this invention is to provide a female nut or a male nut which eliminates all the above-mentioned drawbacks and disadvantages and obviates the transmission of a rotary torque to a conduit due to the rotation of the female or male nut and a sleeve when clamping the female or male nut.

Another object of this invention is to provide a highly hermetical sealability fluid joint for a semiconductor fabricating apparatus which has the above-said female or male nut.

Yet another object of this invention is to provide a highly hermetical sealability fluid joint for a semiconductor fabricating apparatus which has no possibility of damaging a small sphere holder.

Still another object of this invention is to provide a highly hermetical sealing fluid joint for a semiconductor fabricating apparatus which can hold high hermetical sealability over a long period of time.

The above and other related objects and features of the invention will be apparent from a consideration of the following description of the disclosure found in the accompanying drawings and the novelty thereof.

DETAILED DESCRIPTION OF THE PREFERRED EMBODIMENTS

Figure 1:
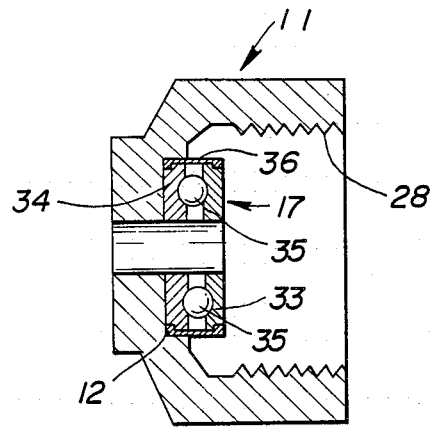
FIG. 1 is a sectional view showing an embodiment of a nut according to the present invention.

Embodiments of this invention will be described in detail with reference to the accompanying drawings, wherein the same reference numerals designate the same or corresponding parts and components through the drawings.

FIG. 1 shows one embodiment of a nut according to the present invention. An engaging recess 12 is formed on the surface of a female nut (cap nut) 11 in pressure contact with a sleeve, a threaded portion 28 is formed on the inner peripheral surface of the female nut 11, and a thrust bearing 17 is press-fitted to and held in the engaging recess 12 of the female nut 11.

In the thrust bearing 17 used in the embodiment described above, a plurality of spheres 35 are filled in an annular grooves between an inner race 33 and an outer race 34, and an annular element 36 is engaged with the outer peripheral surfaces of the inner and outer races 33 and 34.

Figure 2:
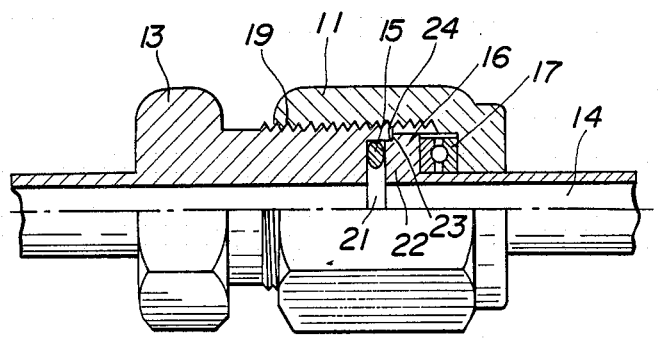
FIG. 2 is a partially sectional view of a fluid joint using the nut of the present invention.

FIG. 2 shows a fluid joint using the above-mentioned female nut 11. A body 13 is contacted through a gasket 15 with a sleeve 14 to form a fluid passage. The female nut 11 is shown engaged with the outer periphery of the sleeve 14 and with the threaded portion 19 of the outer peripheral surface of the body 13 so that the sleeve 14 is clamped through a gasket 15 with the body 13. A flange 16 is formed on the outer peripheral surface of the end of the sleeve 14, and a thrust bearing 17 held in engagement with the female nut 11 is contacted with the flange 16. Thus, even if the cap nut 11 is excessively clamped, the cap nut 11 and the sleeve 14 rotate together so as not to transmit the rotary torque to the sleeve 14.

Figure 3:
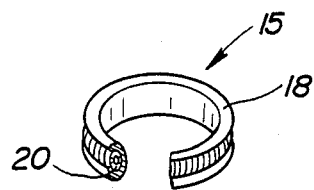
FIG. 3 is a partially sectional view of a gasket employed in the fluid joint of the invention.

The gasket 15 used in the fluid joint is constructed, as shown in FIG. 3, by affixing a coil spring 20 on a ring-shaped metal coating element 18 so as to space the outside center. High hermetical sealability is imparted to the fluid joint by using such a gasket 15.

In the fluid joint described above, an annular recess 21 is formed on the contacting surface of the sleeve 14 with the gasket 15, and a projection 22 to be engaged within the recess 21 is formed on the surface of the body 13 contacting the gasket 15. Thus, when the gasket 15 is contacted under pressure with the sleeve 14 to the effective elastic compression amount, the stepped portion 23 of the projection 22 is stopped at the end face 24 of the body 13. Thus, the gasket 15 is not compressed more than the effective elastic compression amount so as to effectively prevent the gasket 15 from being damaged.

In the fluid joint described above, the contacting surface of the body 13 with the gasket 15 and the sleeve 14 is subjected to a roll burnishing process. When thus subjecting to the roll burnishing process, the surface of the body 13 is surface-hardened so as to improve the surface hardness so that the surface of the body 13 is hardly scratched or damaged with the result that ultrafine linear scratches which can cause the gasket 15 to be deteriorated in the hermetical seal are hardly formed in the gasket 15 formed by coating the coil spring 20 with the metal coating element 18. Thus, the gasket 15 may be repeatedly used. Consequently, the fluid joint in which the gasket 15 is used can maintain highly hermetical seal for a long period of time.

The roll burnishing process may be conducted by a method of contacting the rolling roll or rolls with the contacting surfaces of the body and the sleeve with the gasket. For example, when the sealing surface of the fluid joint of the above embodiment is cut in the roughness of 3.2S and is then subjected to the roll burnishing process, the mirror-polished surface of roughness of approx. 0.8S may be readily provided by the machining time for 1 to 2 sec. The surface hardness of the body and the sleeve can be improved by this burnishing process (in case of stainless steel, the hardness of the base material is improved form 180 HB to 300 HB or higher). Thus, the sealing surfaces of the body and the sleeve are hardly scratched during installation.

Figure 4:
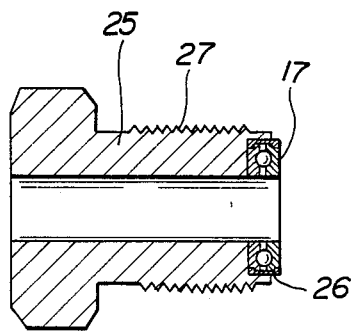
FIG. 4 is a sectional view showing another embodiment of a nut according to the present invention.

FIG. 4 shows another embodiment of a nut according to the present invention. A thrust bearing 17 is engaged with an engaging recess 26 formed on the end of a male nut 25. A threaded portion 27 is formed on the outer peripheral surface of the male nut 25.

Figure 5:
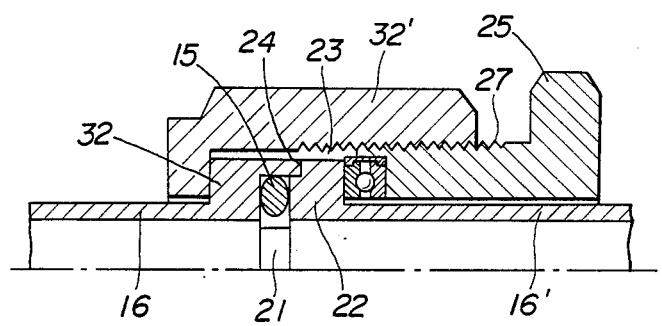
FIG. 5 is a partially sectional view of a fluid joint using the nut of the invention.

FIG. 5 shows a fluid joint which uses the abovementioned male nut 25 of the invention. Two sleeves 16 and 16' are coupled through a gasket 15 by engaging a female nut 32' with the threaded portion 27 of the outer peripheral surface of the male nut which engages with the outer peripheral surface of the sleeve 16'. In this case, when the female nut 32' is excessively clamped, the male nut 25 and the sleeve 16' rotate together through the thrust bearing 17.

Figure 6:
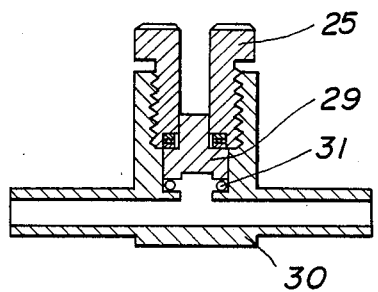
FIGS. 6 and 7 are sectional views showing still another embodiment of a fluid joint using the nut of the invention.
Figure 7:
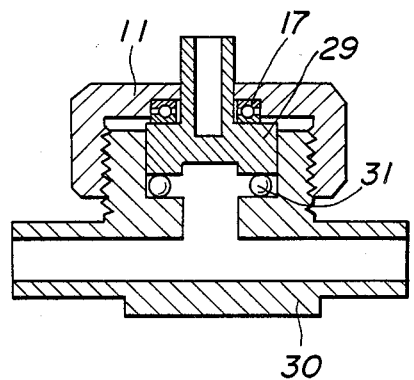
Figure 8:
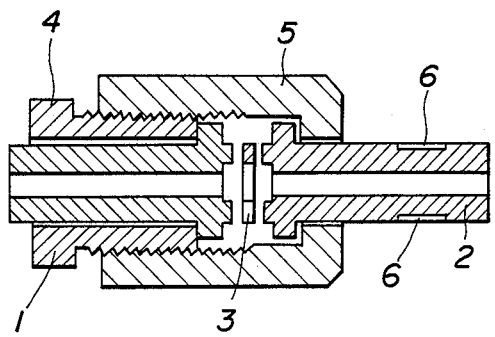
FIG. 8 is a sectional view showing a conventional fluid joint.
Figure 9:
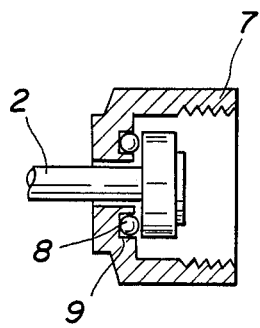
FIG. 9 is a sectional view showing a fluid joint where a female nut holding small spheres and a sleeve are associated.

The nut of the invention may also be used not only in fluid joints constructed as described above, but in other utility that a rotary torque is undesirably transmitted in case of clamping the threads. For example, as shown in FIGS. 6 and 7, a nut is used as a male nut 25 or a female nut 11 for hermetically sealingly clamping a pressure sensor 29 with a body 30.

In this case in a conventional nut, a bearing is generally used. However, if a dimensional limit is incorporated, there is a drawback that the bearing of special dimension is expensive in small quantity. According to the present invention, since the ball bearing effect is directly imparted to the nut, the nut provides various advantages that the nut can be freely designed inexpensively.

What is claimed is:

1. A highly hermetical sealability cap nut clamping fluid joint for a semiconductor fabricating apparatus, the joint comprising
   a tubular body having a threaded portion formed on the outer peripheral surface of one end of said tubular body;
   a gasket;
   a tubular sleeve having a flange formed on the outer peripheral surface of one end thereof for communicating in contact with a through hole of said body at the threaded portion side through said gasket, and
   a female nut engaged with said sleeve for rigidly clamping said body and said sleeve by engaging with the threaded portion of said body,
   said female nut having an engaging recess formed on an inner surface thereof, and a thrust bearing press-fitted into the engaging recess of said female nut, said thrust bearing comprising a plurality of spheres filled in annular grooves between an inner race and an outer race and an annular element engaged with the outer peripheral surfaces of the inner and outer races, said thrust bearing in said recess being contacted under pressure with said sleeve flange, said gasket being a coil spring coated by a metal coating element.

2. The nut according to claim 1, wherein said thrust bearing comprises an inner race, an outer race, a plurality of small spheres filled in an annular groove formed between the inner race and the outer race, and an annular element engaged on the entire outer peripheral surfaces of both of the inner and outer races.

3. The highly hermetical sealability cap nut clamping fluid joint according to claim 1, wherein said body and said sleeve have a roll burnished surfaces contacting said gasket.

4. The highly hermetical sealability cap nut clamping fluid joint according to claim 3, wherein engaging recess and engaging projection are formed on the contacting surfaces of said body and said sleeve through said gasket such that the end face of the engaging recess of said body is contacted with a stepped portion of the engaging projection of said sleeve so as to be unable to be compressed more than an effective elastic compression amount.

5. A highly hermetical sealability cap nut clamping fluid joint for a semiconductor fabricating apparatus having a female and a male nut comprising:
   two sleeves;
   a gasket, said two sleeves being coupled through said gasket by engaging a threaded portion of said male nut engaged externally with one sleeve with said female nut externally engaged with the other sleeve, said male nut having an engaging recess formed on the inner pressure-contacting surface thereof with said sleeves, a thrust bearing press-fitted into the engaging recess of said male nut, said thrust bearing comprising a plurality of spheres filled in annular grooves between an inner race and an outer race and an annular element engaged with the outer peripheral surfaces of the inner and outer races, said thrust bearing in said recess being contacted under pressure with said sleeve flange, said gasket being a coil spring coated by a metal coating element.

6. The highly hermetical sealability cap nut clamping fluid joint according to claim 5, wherein said body and said sleeve have a roll burnished surfaces contacting said gasket.

7. The highly hermetical sealability cap nut clamping fluid joint according to claim 6, wherein engaging recess and engaging projection are formed on the contacting surfaces of said two sleeves through said gasket such that the end face of the engaging recess of said body is contacted with a stepped portion of the engaging projection of said sleeve so as to be unable to be compressed more than an effective elastic compression amount.

8. The clamping fluid joint according to claim 5, wherein said thrust bearing comprises an inner race, an outer race, a plurality of small spheres filled in an annular groove formed between the inner race and the outer race, and an annular element engaged on the entire outer peripheral surfaces of both of the inner and outer races.

* * * * *